2,993,895
3-BENZHYDRYLMORPHOLINE AND SALTS THEREOF, AND METHOD OF PREPARING SAID COMPOUNDS

Stanley O. Winthrop, Montreal, Quebec, Canada, assignor to American Home Products Corporation, New York, N.Y., a corporation of Delaware
No Drawing. Filed Feb. 25, 1959, Ser. No. 795,352
3 Claims. (Cl. 260—247)

This invention is concerned with certain new chemical compounds which are pharmacologically active, and to a process by which they may be prepared from readily available starting materials.

More particularly, my invention relates to the novel chemical compound, 3-benzhydrylmorpholine, to salts thereof, especially salts with hydrohalic acids, and to a new method by which all of these compounds may be prepared from the readily available starting material β,β-diphenylalanine. The new chemical compounds thus resulting, 3-benzhydrylmorpholine, as well as its acid addition salts with pharmaceutically acceptable acids, such as hydrochloric and other hydrohalic acids, are pharmacologically active, particularly as stimulants of the central nervous system.

The new chemical compound which my invention makes it possible to prepare, 3-benzhydrylmorpholine, has the structural formula

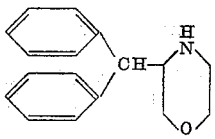

It forms acid addition salts with pharmaceutically acceptable acids, i.e. those which are non-toxic, and these salts exhibit the same pharmacological activity as the free base. They may therefore be used interchangeably in medicine.

The new chemical compound 3-benzhydrylmorpholine, pharmacologically active in the free base form, or in the form of its pharmaceutically acceptable acid addition salts, particularly those with the hydrohalic acids such as hydrochloric acid, may be prepared in accordance with a series of chemical reactions which may be indicated schematically as follows.

Procedural details of the synthesis are given in the following illustrative examples.

EXAMPLE 1

*Ethyl β,β-diphenylalaninate hydrochloride*

40 grams of β,β-diphenylalanine and 600 ml. of 10 percent ethanolic hydrogen chloride were heated at reflux for four hours. The ethanol was stripped off, leaving 46 grams of ethyl β,β-diphenylalaninate hydrochloride, melting point 195–196° C. (dec.). Recrystallization from an ethanol-ether mixture raised the melting point of the compound to 200–201° C. (dec.).

Calculated for $C_{17}H_{20}NO_2Cl$: N, 4.58; Cl, 11.60. Found: N, 4.54; Cl, 11.48.

EXAMPLE 2

*3,3-diphenyl-2-amino-1-propanol*

46 grams (0.15 mole) of ethyl β,β-diphenylalaninate hydrochloride was dissolved in water, neutralized by the addition of sodium carbonate, and the free base, ethyl β,β-diphenylalaninate, taken up in ether and dried. The ether solution (400 ml.) was added dropwise, with stirring to 11.4 grams (0.3 mole) of lithium aluminum hydride in 200 ml. of ether. The addition was complete in 30 minutes and refluxing was continued for another hour. 50 mls. of water was then added, and the precipitated aluminum hydroxide removed by filtration and washed with acetone. The ether and acetone filtrates were then combined and stripped, leaving behind an oily residue. The product was 3,3-diphenyl-2-amino-1-propanol and triturating with hexane gave 14 grams of this product, melting point 117–119° C. Upon recrystallization from benzene the melting point was raised to 120–121° C.

Calculated for $C_{15}H_{17}NO$: C, 79.26; H, 7.54; N, 6.17. Found: C, 79.38; H, 7.74; N, 6.20.

EXAMPLE 3

*3,3-diphenyl-2-(α-chloroacetylamino)-1-propanol*

8.9 grams (0.039 mole) of 3,3-diphenyl-2-amino-1-propanol was added to a mixture of 107 ml. of ethylene dichloride and 71 ml. of water containing 2.3 grams (0.057 mole) of sodium hydroxide. The mixture was

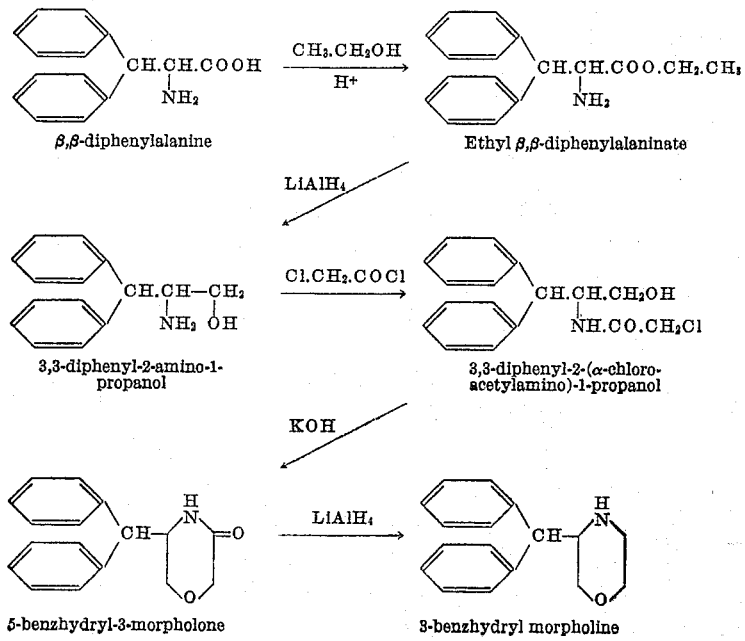

stirred and cooled to 0° C. 6.4 grams (0.057 mole) of chloroacetyl chloride was then added dropwise, while the reaction temperature was maintained around 0° C. The addition was complete in 30 minutes, whereupon the reaction temperature was allowed to warm up to room temperature and the mixture stirred for an additional 3 hours. The ethylene dichloride layer was then dried, and stripped to yield a gummy residue which crystallized from benzene-hexane to give 7.4 grams melting at 106–108° C. The product was 3,3-diphenyl-2-(α-chloroacetylamino)-1-propanol.

Calculated for $C_{17}H_{18}NO_2Cl$: N, 4.61; Cl, 11.67. Found: N, 4.40; Cl, 11.86.

EXAMPLE 4

5-benzhydryl-3-morpholone 1.7 grams (0.0056 mole) of 3,3-diphenyl-2-(α-chloroacetylamino)-1-propanol was dissolved in 20 mls. of absolute ethanol containing 0.32 gram (0.0056 mole) of powdered, dried potassium hydroxide. The solution was stirred at room temperature for 4 hours, after which the precipitated potassium chloride in the amount of 0.38 gram was removed by fitration. The ethanol filtrate was stripped and the oil residue triturated with ether to give 1.0 gram of a solid product melting at 133–135° C. This product was 5-benzhydryl-3-morpholone, and upon recrystallization from methanol its melting point was raised to 135–136° C.

Calculated for $C_{17}H_{17}NO_2$: C, 76.37; H, 6.42; N, 5.24. Found: C, 75.67; H, 6.21; N, 5.19.

EXAMPLE 5

3-benzhydrylmorpholine 3.9 grams (0.0146 mole) of 5-benzhydryl-3-morpholone was dissolved in 150 ml. of tetrahydrofuran and the solution added dropwise, with stirring, to 1.6 gram (0.0292 mole) of lithium aluminum hydride in 50 ml. of tetrahydrofuran. The addition was complete in 20 minutes, and the reaction mixture was then refluxed for an additional period of 2 hours. The hydride complex was then hydrolyzed by the addition of 4.7 ml. of water. After filtration, the ether filtrate was dried and gaseous hydrogen chloride introduced. This resulted in the precipitation of 1.55 gram of a solid product which melted at a temperature in excess of 260° C. (dec.). Upon recrystallization from isopropanol, there was obtained an analytically pure product, 3-benzhydrylmorpholine hydrochloride.

Calculated for $C_{17}H_{20}NOCl$: N, 4.83; Cl, 12.23. Found: N, 4.87; Cl, 12.47.

Upon treatment of the 3-benzhydrylmorpholine hydrochloride with aqueous sodium carbonate the free base, 3-benzhydrylmorpholine was liberated, as a viscous oil. This oil was taken up in ether and dried over sodium sulfate. Upon stripping off the ether the pure free base remained as a light brown viscous oil. By treatment with aqueous hydrogen chloride it was converted to the hydrochloride salt whose composition was established by analysis, thus characterizing the free base.

I claim:
1. A compound selected from the group consisting of 3-benzhydrylmorpholine and hydrohalide salts thereof.
2. 3-benzhydrylmorpholine.
3. 3-benzhydrylmorpholine hydrochloride.

References Cited in the file of this patent

UNITED STATES PATENTS 2,947,749     Winthrop _____ Aug. 2, 1960

OTHER REFERENCES

Cromwell: Journal of the American Chemical Society, vol. 69; pages 1858 and 1859 (1947).

Brewster: Organic Chemistry (Textbook); pages 222 and 223; 2nd edition; third printing (1954); Prentice-Hall Inc., N.Y.

Gaylord: Reduction With Complex Metal Hydrides (Textbook); 1956 edition; page 418; Interscience Publishers, Inc., New York.

Elderfield: Heterocyclic Compounds (Textbook), vol. 6; pages 506 and 530; 1957 edition; John Wiley and Sons, Inc.